3,778,432
ISOCYANATES AND CARBAMATES OF PENICILLINS AND 3-CEPHEM-4-CARBOXYLIC ACIDS
Seemon H. Pines, Murray Hill, N.J., assignor to Merck & Co., Inc., Rahway, N.J.
No Drawing. Filed Dec. 13, 1971, Ser. No. 207,624
Int. Cl. C07d 99/24
U.S. Cl. 260—243 C        5 Claims

ABSTRACT OF THE DISCLOSURE

Preparation of 6-amino-6-methoxy penicillins and 7-amino-7-methoxy-3-cephem-4-carboxylic acid and its esters which are useful as intermediates in the production of the antibiotics 7-acylamido-7-methoxy-3-cephem-4-carboxylic acid and its esters and salts. The products are prepared by removal of the substituted oxycarbonyl group from a 6(or 7)- substituted oxycarbonylamino-6(or 7)-methoxy compound by reduction employing a chemical, catalytic or photochemical method under non-acidic conditions.

This invention relates to a novel process for preparing 6-amino-6-methoxy penicillins and 7-amino-7-methoxy cephalosporins by reducing the corresponding 6(or 7)- substituted oxycarbonylamino compound either chemically, catalytically or photochemically under non-acidic conditions. These compounds are useful as intermediates in the preparation of the 7-acylamido-7-methoxy cephalosporin antibiotics.

Those cephalosporin compounds have a 7-methoxy substituent exhibit antibacterial properties similar to the known penicillins and cephalosporin compounds. However, the 7-methoxy substituted compounds exhibit a broader spectrum of activity.

Cephalosporins having a 7-methoxy substituent are effective against Gram-negative bacteria including *Escherichia coli, Proteus vulgaris, Proteus mirabilis, Proteus morganii, Salmonella schottmuelleri, Klebsiella pneumoniae* AD, *Klebsiella pneumoniae* B, and *Paracolobactrum arizoniae* and Gram-positive bacteria including *Staphylococcus aureus, Streptococcus pyogenes* and *Dipolcoccus pneumoniae*.

The 7-methoxy cephalosporins are useful in removing susceptible microorganisms from pharmaceutical, medical and dental equipment and as bactericides in industrial applications, for example, in water based paints and in the white water of paper mills to inhibit the growth of harmful bacteria.

Penicillins having a 6-methoxy substituent provide a convenient intermediate in the preparation of the 7-acylamido-7-methoxy substituted cephalosporins.

The products of this invention may be represented by the following structural formula:

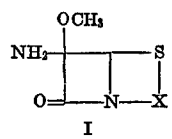

I wherein X is a divalent radical of the formula:

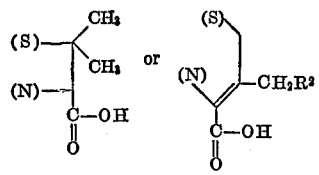

and the esters and salts thereof wherein $R^2$ can be any one of the substituents known either to impart antibacterial activity or to be a useful intermediate. Examples of the $R^2$ substituent are hydrogen, hydroxy, halo such as fluoro, chloro or bromo, carbamoyloxy, N-lower alkyl carbamoyloxy such as N-methyl carbamoyloxy and the like, N,N-di-lower alkyl carbamoyloxy such as N,N-dimethyl carbamoyloxy and the like, a tertiary amine such as pyridine and the like, lower alkoxy such as methoxy, ethoxy, tertiary butoxy and the like, acyloxy, for example, lower alkanoyloxy such as acetoxy, propionyloxy and the like, aroyloxy such as benzoyloxy and the like, a 5-membered heterocyclic thio such as 5-methyl-1,3,4-thiadiazolyl-2-thio and the like or a 6-membered heterocyclic thio carbonylthio such as N-piperidino-thiocarbonylthio, N-morpholino thio carbonylthio and the like.

A preferred embodiment of this invention relates to the preparation of compounds selected from the following structural formulas:

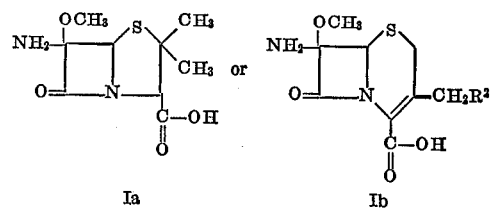

Ia         Ib and its esters wherein $R^2$ is hydrogen, lower alkanoyloxy, carbamoyloxy or pyridine.

In carrying out these reactions it is preferred to protect the carboxy group and other groups in the nucleus requiring protection by blocking the carboxylic acid or other group by various ester radicals. Examples of these ester radicals are methoxymethyl, trichloroethyl, tert-butyl, benzoylmethyl, benzyl, benzhydryl, p-methoxybenzyl and the like.

The novel process of this invention is depicted by the following equation:

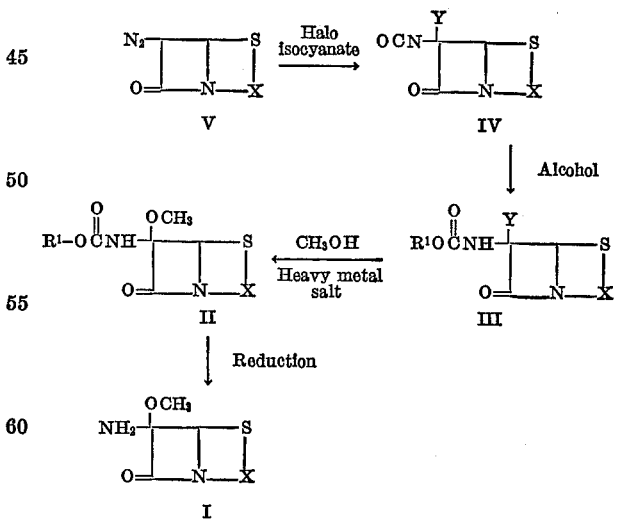

wherein X is as defined above; Y is halo such as bromo or iodo and

is a readily removable group which can be removed by chemical, photochemical or catalytic means. Photochemically removable groups include those groups of the formula

wherein $R^1$ is a nitro substituted phenyl lower alkyl such as 2-nitrobenzyl, 2,4-dinitrobenzyl, 2-nitro-4,5-dimethoxybenzyl and the like. Catalytically and chemically removable groups include those groups wherein $R^1$ is benzyl, mono- or dimethoxy-substituted benzyl, mono- or dimethoxy-substituted 2-naphthylmethyl and the like, for example, 3,4-dimethoxybenzyl, 5-, 6-, 7-, or 8-methoxynaphthyl-2-methyl or haloalkyl, for example, trihalo lower alkyl such as trichloroethyl and the like.

In the process depicted above the diazo compound (V, supra) is treated with a haloisocyanate such as iodoisocyanate, bromoisocyanate and the like in a suitable inert solvent such as tetrahydrofuran, dioxane, chloroform, benzene and the like. The reaction is initially conducted at a temperature below 0° C. and then allowed to warm to room temperature. The 6(or 7)-halo-6(or 7)-isocyanato compound (IV, supra) is then treated with an alcohol of the formula: $R^1OH$ wherein $R^1$ is as defined above. This reaction is conveniently conducted at room temperature for a period of time of from about 10 hours to about 30 hours to afford the 6(or 7)-halo-6(or 7)-protected amino compound (III, supra). The 6(or 7)-halo-6(or 7)-protected amino compound (III) is then treated with methanol in the presence of a heavy metal cation such as the silver cation derived from a heavy metal salt, for example, silver tetrafluoroborate. This reaction is preferably conducted in solvents which do not contain an active hydrogen such as methylene chloride, chloroform, benzene, toluene, ether and the like. The 6(or 7)-methoxy-6(or 7)-protected amino compound (II, supra) is then reduced to the desired 6(or 7)-methoxy-6(or 7)-amino compound (I, supra) by treating Compound II with either (1) a chemical reducing agent such as chromous chloride, zinc and the like in a suitable inert solvent such as acetone, dioxane, ethylacetate and the like; (2) hydrogen with a catalyst such as palladium and the like in a suitable solvent or mixture of solvents such as dioxane and methanol or (3) light of wavelength of about 3000 A. for a period of time of from 1 to 24 hours in a suitable solvent such as chlorofrom, tetrahydrofuran, 1,2-dimethoxyethane and the like.

The 6(or 7)-amino-6(or 7)-methoxy compound (I, supra) is then acylated to afford the 6(or 7)-acylamido-6(or 7)-methoxy compounds of the formula (VI, infra):

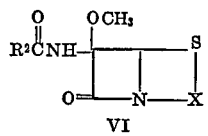

wherein X is as defined above and $R^2$ is a radical, for example, benzyl, p-hydroxybenzyl, α-aminobenzyl, α-carboxybenzyl, α-azidobenzyl, allylthiomethyl, butylmercaptomethyl, D-(or L)-4-amino-4-carboxybutyl, α-chloro-n-heptyl, ethyl, 3- or 5-nitrobenzyl, phenethyl, β,β-diphenylethyl, phenylthiomethyl, 2-thenyl, 3-thenyl, α-amino-2-thienylmethyl, α-methylaminobenzyl, α-(N-methylsulfamyl)benzyl, D(—)-α-guanidino-2-thienylmethyl, D(—)-α-guanidinobenzyl, 4-guanidinophenoxymethyl, 4-guanidinomethylbenzyl, cyanomethyl, 2,6-dimethoxy-4-guanidinophenyl, 2- or 3-furylmethyl, 1-H-tetrazol-1-yl-methyl and the like.

The 7-diazo cephalosporanic acid ester is described in U.S. patent application No. 149,364, filed June 2, 1971, in the names of Burton G. Christensen, Sandor Karady, Lovji D. Cama and Meyer Sletzinger.

The following examples illustrate the novel process of this invention. However, the examples are illustrative only and it will be apparent to those skilled in the art that other reagents similar to those described in the following examples may be employed to afford similar results.

EXAMPLE 1

Sodium 6-amino-6-methoxypenicillanate

Step A: Benzyl 6-iodo-6-isocyanatopenicillanate.—To a solution of benzyl 6-diazopenicillanate (2 g.) in 30 ml. of tetrahydrofuran at —30° C. is added the solution of iodoisocyanate prepared as described below. The reaction mixture is allowed to warm to room temperature, then it is treated with sufficient sodium thiosulfate (0.1 N) to give a negative starch-iodide test. Aqueous sodium bicarbonate is added until the reaction mixture has a pH of 7. The organic solvents are removed in vacuo. The residue is extracted into methylene chloride, dried over magnesium sulfate and evaporated to afford crude benzyl 6-iodo-6-isocyanatopenicillanate.

Preparation of iodoisocyanate.—Five grams of iodine (0.02 mole) is dissolved in 100 ml. of ethylene glycol dimethyl ether and cooled to —30° C. To it is added 5 g. (0.034 mole) silver cyanate in one portion with stirring. After 30 minutes at —30° C., the supernatent liquid is removed by filtration and assayed by thiosulfate titration. The solution is used as is.

Step B: Benzyl 6-iodo-6-benzyloxycarbonylamino penicillanate.—The benzyl 6-iodo-6-isocyanatopenicillanate is dissolved in 20 ml. of benzyl alcohol containing 2 drops of pyridine. After 24 hours at room temperature, the volatiles are removed in high vacuum to afford benzyl 6-iodo-6-benzyloxycarbonylamino penicillanate.

Step C: Benzyl 6-methoxy-6-benzyloxycarbonylamino penicillanate.—To benzyl 6-iodo-6-benzyloxycarbonylamino penicillanate in 50 ml. of methanol is added 0.5 gm. of silver tetrafluoroborate. The suspension is stirred vigorously for two hours at room temperature, then evaporated under reduced pressure. A chloroform extraction of the residue gives the benzyl 6-methoxy-6-benzyloxycarbonylamino penicillanate which is purified by chromatography over silica gel (40 g.) using as the eluant benzene in hexane.

Step D: Sodium 6-amino-6-methoxypenicillanate.—The benzyl 6-methoxy-6-benzyloxycarbonylamino penicillanate (100 mg.) is dissolved in dioxane:methanol (1:1) containing an equal weight of 10% Pd/C. It is shaken under 40 p.s.i. hydrogen pressure for two hours, filtered, and concentrated in vacuo to dryness. The residue is taken up in a mixture of 10 ml. ethyl acetate and 30 ml. of ½ saturated sodium bicarbonate solution. The aqueous layer is lyophilized to provide sodium 6-amino-6-methoxypenicillanate.

NMR: (D$_2$O) τ(TMS) 4.53 (5H), 5.72 (3H), 8.45, 8.49 (2-CH$_3$), 6.58 (—OCH$_3$).

EXAMPLE 2

Benzhydryl 3-acetoxymethyl-7-amino-7-methoxy-3-cephem-4-carboxylate

Step A: Benzhydryl 3-acetoxymethyl-7-iodo-7-isocyanato-3-cephem-4-carboxylate.—To a solution of benzhydryl-7-diazocephalosporanate (2.2 g.) in tetrahydrofuran (30 ml.) at —30° C. is added a solution of iodoisocyanate (prepared as described in Example 1, Step A). The reaction mixture is allowed to warm to room temperature and is then treated with sodium thiosulfate (0.1 N) until the starch iodide test shows the absence of iodine. The pH of the reaction mixture is adjusted to 7 and the solvents are removed under vacuum. The residue is taken up in methylene chloride and the solution dried over magnesium sulfate. The solution is filtered and the solvent removed to afford benzhydryl 7-iodo - 7 - isocyanatocephalosporanate.

Step B: Benzhydryl 3 - acetoxymethyl - 7 - iodo - 7-2,2,2 - trichloroethoxycarbonylamino) - 3 - cephem-4-carboxylate.—Benzhydryl 3 - acetoxymethyl - 7 - iodo - 7-isocyanato3-cephem-4-carboxylate (2.0 g.) is stirred with 1 ml. of trichloroethanol in 4 ml. of tetrahydrofuran for 16 hours. The volatiles are pumped off in high vacuum to afford benzhydryl 3-acetoxymethyl-7-iodo-7-(2,2,2-trichloroethoxycarbonylamino)-3-cephem-4-carboxylate.

Step C: Benzhydryl 3 - acetoxymethyl - 7 - methoxy-7-(2,2,2-trichloroethoxycarbonylamino) - 3 - cephem-4-carboxylate.—The benzhydryl 3-acetoxymethyl-7-iodo-7-(2,2,2-trichloroethoxycarbonylamino) - 3 - cephem - 4-carboxylate in 120 ml. of methanol is stirred with silver tetrafluoroborate (0.6 g.) for two hours. After removing the solvent in vacuo, the residue is taken up in chloroform, filtered, washed with water and dried over magnesium sulfate. The solution is filtered and the solvent removed to afford crude product. Chromatography over silica (benzene:5% ethyl acetate) affords benzhydryl 3-acetoxymethyl-7-methoxy - 7 - (2,2,2-trichloroethoxycarbonylamino)-3-cephem-4-carboxylate.

Step D: Benzhydryl 3 - acetoxymethyl-7-amino-7-methoxy-3-cephem-4-carboxylate.—Benzhydryl 3 - acetoxymethyl - 7 - methoxy-7-(2,2,2 - trichloroethoxycarbonylamino)-3-cephem-4-carboxylate (300 mg.) is dissolved in 25 ml. of acetone. To the reaction mixture is added 150 mg. of chromous chloride in 15 ml. of acetone. The reaction mixture is stirred for two hours at room temperature. The acetone is removed in vacuo and the product taken up in ethylacetate. The ethylacetate layer is washed with water, dried (MgSO₄) and concentrated to dryness. Chromatography on 15 g. of silica gel affords benzhydryl 3-acetoxymethyl - 7 - amino-7-methoxy-3-cephem-4-carboxylate.

NMR: (CDCl₃) τ(TMS) 6.65 (C-2), 5.05 (C-3), 5.17 (C-6), 6.50 (—OCH₃),

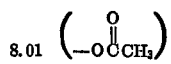

EXAMPLE 3

Benzhydryl 3-carbamoyloxymethyl-7-amino-7-methoxy-3-cephem-4-carboxylate

Step A: Benzhydryl 3 - carbamoyloxymethyl-7-iodo-7-isocyanato-3-cephem-4-carboxylate.—To a solution of benzhydryl 3 - carbamoyloxymethyl-7-diazo-3-cephem-4-carboxylate (2.0 g.) in tetrahydrofuran (30 ml.) at −30° C. is added a solution of iodo isocyanate (prepared as described in Example 1, Step A). The reaction mixture is allowed to warm to room temperature and is then treated with sodium thiosulfate (0.1 N) until a negative starch iodide test is obtained. The pH of the reaction mixture is adjusted to 7 with aqueous sodium bicarbonate. The solvents are removed under vacuum. The residue is triturated with methylene chloride and the solution dried over magnesium sulfate. The solution is filtered and the solvent removed to afford benzhydryl 3-carbamoyloxymethyl-7-iodo-7-isocyanato-3-cephem-4-carboxylate.

Step B: Benzhydryl 3 - carbamoyloxymethyl-7-iodo-7-(2 - nitro - 4,5 - dimethoxybenzyloxycarbonylamino)-3-cephem - 4 - carboxylate.—Benzhydryl 3-carbamoyloxymethyl-7-iodo-7-isocyanato - 3 - cephem - 4 - carboxylate (2.0 g.) is stirred with 2-nitro-4,5-dimethoxybenzyl alcohol (2.0 ml.) in tetrahydrofuran (10 ml.) for 16 hours.

The volatile constituents are removed under high vacuum to afford benzhydryl 3-carbamoyloxymethyl-7-iodo-7-(2-nitro - 4,5 - dimethoxybenzyloxycarbonylamino)-3-cephem-4-carboxylate.

Step C: Benzhydryl 3-carbamoyloxymethyl-7-methoxy-7-(2-nitro - 4,5 - dimethoxybenzyloxycarbonylamino)-3-cephem - 4 - carboxylate.—Benzhydryl 3-carbamoyloxymethyl-7-iodo-7-(2-nitro - 4,5 - dimethoxybenzyloxycarbonylamino)-3-cephem-4-carboxylate in methanol (120 ml.) is stirred with silver tetrafluoroborate (0.6 g.) for two hours. The excess methanol is removed under vacuum and the residue is dissolved in chloroform. The solution is filtered, washed with water and dried over magnesium sulfate. The solution is filtered and the solvent removed to afford the crude product. Chromatography over silica (benzene: 15% ethyl acetate) affords benzhydryl 3 - carbamoyloxymethyl-7-methoxy-7-(2-nitro - 4,5 - dimethoxybenzyloxycarbonylamino)-3-cephem-4-carboxylate.

Step D: Benzhydryl 3 - carbamoyloxymethyl-7-amino-7-methoxy-3-cephem-4-carboxylate.—Benzhydryl 3 - carbamoyloxymethyl - 7 - methoxy-7-(2-nitro-4,5-dimethoxybenzyloxycarbonylamino)- 3 - cephem-4-carboxylate (1.0 g.) in dioxane (500 ml.) is photolyzed at room temperature for 12 hours employing a Pyrex filter. The reaction mixture is evaporated to dryness under vacuum to afford benzhydryl 3 - carbamoyloxymethyl-7-amino-7-methoxy-3-cephem-4-carboxylate.

By following substantially the procedure described in Example 1, 2 or 3, all of the products described in Table I may be prepared. The following equation taken together with Table I indicates the method employed, the starting materials, intermediates and final products which are prepared in Table I.

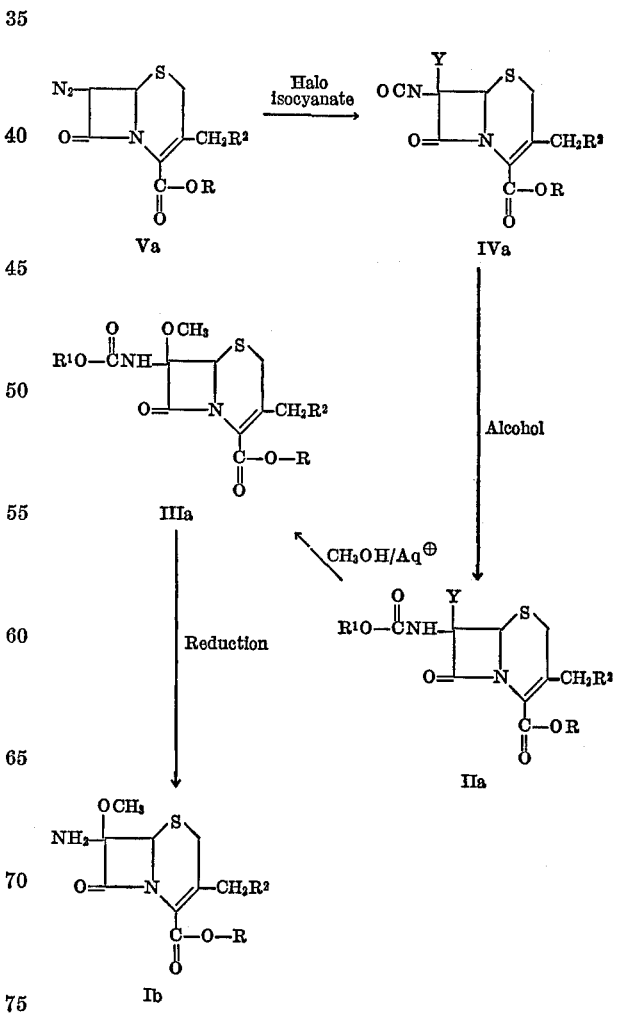

TABLE I

| Ex. No. | R | R¹ | R² | Method [1] |
|---|---|---|---|---|
| 4 | Ph-CH₂- | Cl₃CCH₂- | H | A |
| 5 | (Φ)₂CH- | CH₃O-C₆H₄-CH₂- | -OC(O)CH₃ | B |
| 6 | ΦCH₂- | Cl₃CCH₂- | -OC(O)NH₂- | A |
| 7 | p-CH₃ΦCH₂- | 4,5-(CH₃O)₂-2-NO₂-C₆H₂-CH₂- | F | C |
| 8 | ΦCH₂- | Cl₃CCH₂- | -OC(O)CH₃ | A |
| 9 | CH₃OCH₂- | 2-NO₂-C₆H₄-CH₂- | -OC(O)NHCH₃ | C |
| 10 | (CH₃)₃C- | 3,4-(CH₃O)₂-C₆H₃-CH₂- | -OC(O)N(CH₃)₂ | B |
| 11 | CH₃OCH₂- | 2,4-(O₂N)₂-C₆H₃-CH₂- | -N⁺(pyridinium) | C |
| 12 | Same as above | Cl₃CCH₂- | -OCH₃ | A |
| 13 | (Φ)₂CH- | 6-CH₃O-naphth-2-yl-CH₂- | -OC₂H₅ | B |
| 14 | Same as above | Ph-CH₂- | -OC(CH₃)₃ | B |
| 15 | do | ΦCH₂- | -OC(O)C₂H₅ | B |
| 16 | do | CH₃O-C₆H₄-CH₂ | -OC(O)-Φ | B |
| 17 | CH₃OCH₂- | 2-NO₂-C₆H₄-CH₂ | -OH | C |
| 18 | Same as above | Same as above | -S-(5-methyl-1,3,4-thiadiazol-2-yl) | C |
| 19 | (Φ)₂CH- | 4,5-(CH₃O)₂-2-NO₂-C₆H₂-CH₂- | Br | C |
| 20 | Same as above | Same as above | Cl | C |
| 21 | do | do | -SC(S)-N(piperidinyl) | C |
| 22 | do | do | -SC(S)-N(morpholinyl) | C |

[1] See the following.—Method A=Chemical; Method B=Catalytically; Method C=Photochemically.

What is claimed is:

1. A compound of the formula:

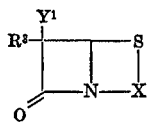

and its methoxymethyl, trichloroethyl, tert-butyl, benzoylmethyl, benzyl, benzhydryl or p-methoxybenzyl esters, wherein X is a divalent radical of the formula:

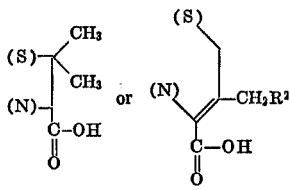

wherein $R^2$ is hydrogen, hydroxy, halo, lower alkanoyloxy, carbamoyloxy, N-lower alkyl carbamoyloxy, N,N-di-lower alkylcarbamoyloxy, benzoyloxy, pyridine, lower alkoxy, 5-methyl-1,3,4-thiadiazolyl-2-thio, N-piperidinothiocarbonylthio, or N-morpholinothiocarbonylthio; $R^3$ is isocyanato or a radical of the formula:

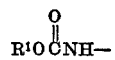

wherein $R^1$ is nitro substituted phenyl lower alkyl, benzyl, mono- or dimethoxy substituted benzyl, mono- or dimethoxy 2-naphthylmethyl or trihalolower alkyl and $Y^1$ is halo or methoxy.

2. A compound according to claim 1 of the formula:

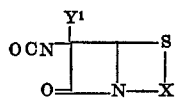

and its methoxymethyl, trichloroethyl, tert-butyl, benzoylmethyl, benzyl, benzhydryl or p-methoxybenzyl esters, wherein X is a divalent radical of the formula:

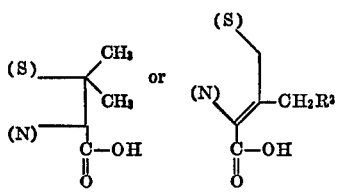

wherein $R^2$ is hydrogen, hydroxy, halo, lower alkanoyloxy, carbamoyloxy, N-lower alkyl carbamoyloxy, N,N-di-lower alkyl carbamoyloxy, benzoyloxy, pyridine, lower alkoxy, 5-methyl-1,3,4-thiadiazolyl-2-thio, N-piperidinothiocarbonylthio, or N-morpholinothiocarbonylthio; and $Y^1$ is halo or methoxy.

3. A compound according to claim 1 of the formula:

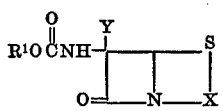

and its methoxymethyl, trichloroethyl, tert-butyl, benzoylmethyl, benzyl, benzhydryl or p-methoxybenzyl esters, wherein X is a divalent radical of the formula:

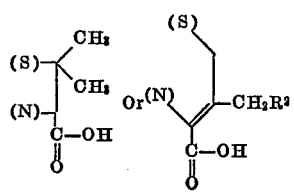

wherein $R^2$ is hydrogen, hydroxy, halo, lower alkanoyloxy, carbamoyloxy, N-lower alkyl carbamoyloxy, N,N-di-lower alkyl carbamoyloxy, benzoyloxy, pyridine, lower alkoxy, 5-methyl-1,3,4-thiadiazolyl-2-thio, N-piperidinothiocarbonylthio, or N-morpholinothiocarbonylthio; $R^1$ is nitro substituted phenyl lower alkyl, benzyl, mono- or dimethoxy substituted benzyl, mono- or dimethoxy 2-naphthylmethyl or trihalolower alkyl and Y is halo.

4. A compound according to claim 1 of the formula:

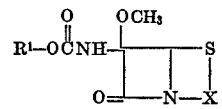

and its methoxymethyl, trichloroethyl, tert-butyl, benzoylmethyl, benzyl, benzhydryl or p-methoxybenzyl esters, wherein X is a divalent radical of the formula:

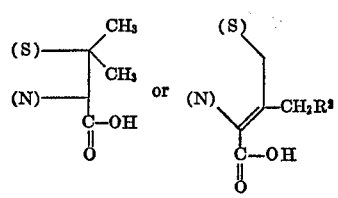

wherein $R^2$ is hydrogen, hydroxy, halo, lower alkanoyloxy, carbamoyloxy, N-lower alkyl carbamoyloxy, N,N-di-lower alkylcarbamoyloxy, benzoyloxy, pyridine, lower alkoxy, 5-methyl-1,3,4-thiadiazolyl-2-thio, N-piperidinothiocarbonylthio, or N-morpholinothiocarbonylthio; $R^1$ is nitro substituted phenyl lower alkyl, benzyl, mono- or dimethoxy substituted benzyl, mono- or dimethoxy 2-naphthylmethyl or trihalolower alkyl.

5. A compound according to claim 1 of the formula:

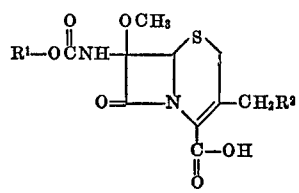

and its methoxymethyl, trichloroethyl, tert-butyl, benzoylmethyl, benzyl, benzhydryl or p-methoxybenzyl esters, wherein $R^1$ is nitro substituted phenyl lower alkyl, benzyl, mono- or dimethoxy substituted benzyl, mono- or dimethoxy 2-naphthylmethyl or trihalolower alkyl and $R^2$ is hydrogen, lower alkanoyloxy, carbamoyloxy or pyridine.

References Cited

UNITED STATES PATENTS 3,487,079   12/1969   Sheehan _____ 260—243

OTHER REFERENCES

Hanson et al.: Chem. Abstracts, 73:25728p (1970).
Chau: Chem. Abstracts, 74:42004n (1971).

HENRY R. JILES, Primary Examiner

G. T. TODD, Assistant Examiner

U.S. Cl. X.R.

260—239.1; 424—246, 271